United States Patent
Schubring et al.

(10) Patent No.: US 8,231,164 B2
(45) Date of Patent: Jul. 31, 2012

(54) REMOVABLE IN-FLOOR STORAGE DEVICE

(75) Inventors: James D. Schubring, Shelby Township, MI (US); Werner H. Schneider, Waterford, MI (US); Eugene Bowerman, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 259 days.

(21) Appl. No.: 12/616,999

(22) Filed: Nov. 12, 2009

(65) Prior Publication Data

US 2010/0127032 A1 May 27, 2010

Related U.S. Application Data

(60) Provisional application No. 61/116,711, filed on Nov. 21, 2008.

(51) Int. Cl.
*B60R 11/00* (2006.01)

(52) U.S. Cl. ............ 296/37.14; 296/193.07; 224/404

(58) Field of Classification Search ............ 296/37.14, 296/37.6, 76, 193.07, 37.1; 224/404, 542
See application file for complete search history.

(56) References Cited

U.S. PATENT DOCUMENTS

| | | | |
|---|---|---|---|
| 4,522,442 A * | 6/1985 | Takenaka | 296/37.1 |
| 4,809,897 A | 3/1989 | Wright, Jr. | |
| 5,061,002 A * | 10/1991 | Saso | 296/37.3 |
| 5,636,890 A * | 6/1997 | Cooper | 296/37.1 |
| 6,241,137 B1 | 6/2001 | Corr | |
| 6,247,741 B1 | 6/2001 | Seel et al. | |
| 6,290,277 B1 | 9/2001 | Spykerman et al. | |
| 6,338,518 B1 * | 1/2002 | D'Annunzio et al. | 296/37.8 |
| 6,481,773 B1 | 11/2002 | Salani et al. | |
| 6,502,886 B1 * | 1/2003 | Bleau et al. | 296/37.3 |
| 6,505,874 B2 | 1/2003 | Ando et al. | |
| 6,733,060 B1 | 5/2004 | Pavkov et al. | |
| 6,890,015 B2 | 5/2005 | Carlsson et al. | |
| 6,926,348 B2 | 8/2005 | Krueger et al. | |
| 7,011,352 B2 | 3/2006 | Matsuoka et al. | |
| 7,097,224 B2 * | 8/2006 | Lester et al. | 296/37.14 |
| 7,374,221 B2 * | 5/2008 | McClure et al. | 296/37.6 |
| 7,393,037 B2 * | 7/2008 | Hwang | 296/37.14 |
| 7,410,081 B2 * | 8/2008 | McClure et al. | 224/403 |
| 7,503,610 B2 * | 3/2009 | Karagitz et al. | 296/37.16 |
| 7,597,372 B2 * | 10/2009 | Nagamoto et al. | 296/37.14 |
| 7,621,587 B1 * | 11/2009 | Hanser et al. | 296/156 |
| 2001/0022451 A1 * | 9/2001 | Ando et al. | 296/37.16 |
| 2006/0016131 A1 | 1/2006 | Nagamoto et al. | |
| 2009/0189404 A1 * | 7/2009 | Anderson et al. | 296/37.6 |

* cited by examiner

*Primary Examiner* — Glenn Dayoan
*Assistant Examiner* — Pinel Romain
(74) *Attorney, Agent, or Firm* — Ralph E. Smith (57) ABSTRACT

A removable in-floor storage device for a vehicle floorpan well, including a lid assembly have a frame mounted on a floorpan surface about the periphery of the floorpan well so as to define a frame opening, and a lid pivotally mounted on the frame to move from a closed position to an open position allowing access to the frame opening. The storage device further includes a removable storage bin adapted to be received within the frame opening and supported within the frame opening by the frame, to thereby define a storage chamber within the vehicle generally beneath the floorpan surface.

13 Claims, 8 Drawing Sheets

REMOVABLE IN-FLOOR STORAGE DEVICE

CROSS-REFERENCE TO RELATED APPLICATIONS

This application claims the benefit of U.S. Provisional Patent Application No. 61/116,711 filed Nov. 21, 2008.

TECHNICAL FIELD

The invention relates generally to vehicle interior containers and, more particularly, to vehicle in-floor storage.

BACKGROUND OF THE INVENTION

Existing vehicles typically have passenger cabins equipped with fixed storage containers, including pockets or compartments located in center consoles, overhead consoles, dashboards and doors. These compartments may include a plurality of surfaces spaced apart with respect to each other to define recesses or cavities. The surfaces may be spaced apart generally short distances such that it may be somewhat cumbersome to reach into the container to clean all portions of the surfaces. In addition, these containers may occupy space within the passenger cabin above the floorpan that would otherwise be available for passengers, cargo or vehicle devices.

The inventors have herein recognized a need to provide a vehicle interior storage container that may increase the space of the passenger cabin above the floorpan and may also be selectively removed from the vehicle.

SUMMARY OF THE INVENTION

In accordance with the invention, a removable in-floor storage device for a vehicle whose floorpan defines a well, for example, between the first and second rows of seats, includes a lid assembly having a frame adapted to be fixedly attached to the floorpan, wherein the frame forms a perimeter wall about an upper portion of the well to define an opening through the frame into the well, and wherein an external flange on the frame overlies a first portion of the floorpan surface immediately adjacent to the well. By way of example, in an exemplary embodiment, an adhesive or threaded fasteners is used to mount the frame's retaining flange to the vehicle floorpan.

The lid assembly also includes a lid pivotally attached to the frame by a hinge, such that the lid may be lifted to provide access to the opening in the frame, and otherwise closed to cover the frame opening. In an exemplary embodiment, the lid hinge is mounted on the frame's perimeter wall to advantageously position the hinge lower in the lid assembly than the respective upper surfaces of the lid and the frame's retaining flange, such that the hinge does not project above the surface of the lid assembly when the lid is moved to its closed position.

The storage device further includes a removable storage bin received within the opening defined by the lid assembly's frame, to thereby define a storage chamber within the floorpan well. In an exemplary embodiment, the frame opening includes a bin seat defined within the floorpan well by an additional flange extending inwardly from the frame walls, and the storage bin includes a complementary external flange by which the storage bin is supported within the opening by the frame's bin seat. In this manner, the bottom surface of the storage bin may be advantageously suspended above the bottom surface of the floorpan well to thereby reduce noise transmission through the storage bin into the vehicle cabin.

In accordance with another aspect of the invention, an in-floor storage system for a vehicle includes a vehicle floorpan defining a well extending beneath an adjacent floorpan surface, for example, located between the first and second rows of vehicle seats. The vehicle storage system also includes a lid assembly having a frame adapted to be fixedly attached to the floorpan surface, wherein the frame forms a perimeter wall about an upper portion of the well to define an opening through the frame into the well, and wherein an external flange on the frame overlies a first portion of the floorpan surface immediately adjacent to the well. The lid assembly includes a lid pivotally attached to the frame by a hinge, such that the lid may be lifted to provide access to the frame opening, and otherwise closed to cover the frame opening, preferably with the lid's upper surface being generally coplanar with, or otherwise only slightly raised above, the uppermost surface of the frame's retaining flange.

In an exemplary vehicle storage system, the lid hinge is mounted on the frame's perimeter wall to advantageously position the hinge lower in the lid assembly than the respective upper surfaces of the lid and the frame's retaining flange, such that the hinge does not project above the surface of the lid assembly when the lid is moved to its closed position. The floorpan also defines a slight recess in the floorpan surface about the periphery of the well that is adapted to receive the retainer flange of the frame, such that upper surface of the frame's retaining flange is generally flush with the adjacent floorpan surface, for example, to permit a seamless extension of a floor covering over both the adjacent floorpan surface and the frame's retainer flange.

The vehicle storage system further includes a removable storage bin received within the frame opening to thereby define a storage chamber within the floorpan well. In an exemplary embodiment, the frame opening includes a bin seat defined within the floorpan well by an additional flange extending inwardly from the frame walls, and the storage bin includes a complementary external flange by which the storage bin is supported within the opening by the frame's bin seat. In this manner, the bottom surface of the storage bin may be advantageously suspended above the bottom surface of the floorpan well to thereby reduce noise transmission through the storage bin into the vehicle cabin.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

DETAILED DESCRIPTION OF THE EXEMPLARY EMBODIMENT

Referring to FIGS. 1-5, an exemplary vehicle storage system 10 in accordance with the invention is provided for installation in a the floorpan 11 of a vehicle between a first seating row section 92 used for supporting at least a first row of conventional vehicle seats (not shown) and a second row section 94 used for supporting a second row of conventional vehicle seats (also not shown). Specifically, as illustrated in the drawings, the vehicle floorpan 11 defines a pair of floorpan wells 14,16 between the first and second seat row sections 92,94 that are sized to receive identical first and second storage devices 18,20, respectively. It will be appreciated that, while the floorpan wells 14,16 are shown in FIGS. 1-5 as being of identical size and shape, the invention contemplates the use of floorpan wells of different size and/or shape. Similarly, it will be appreciated that similar floorpan wells, for use with a storage device in accordance with the invention, may likewise be defined in the floorpan 11 in front of the first seat row section 92, in the trunk section 96 located generally behind the second seat row section 94, and in other suitable sections of the floorpan 11.

Figure 1:
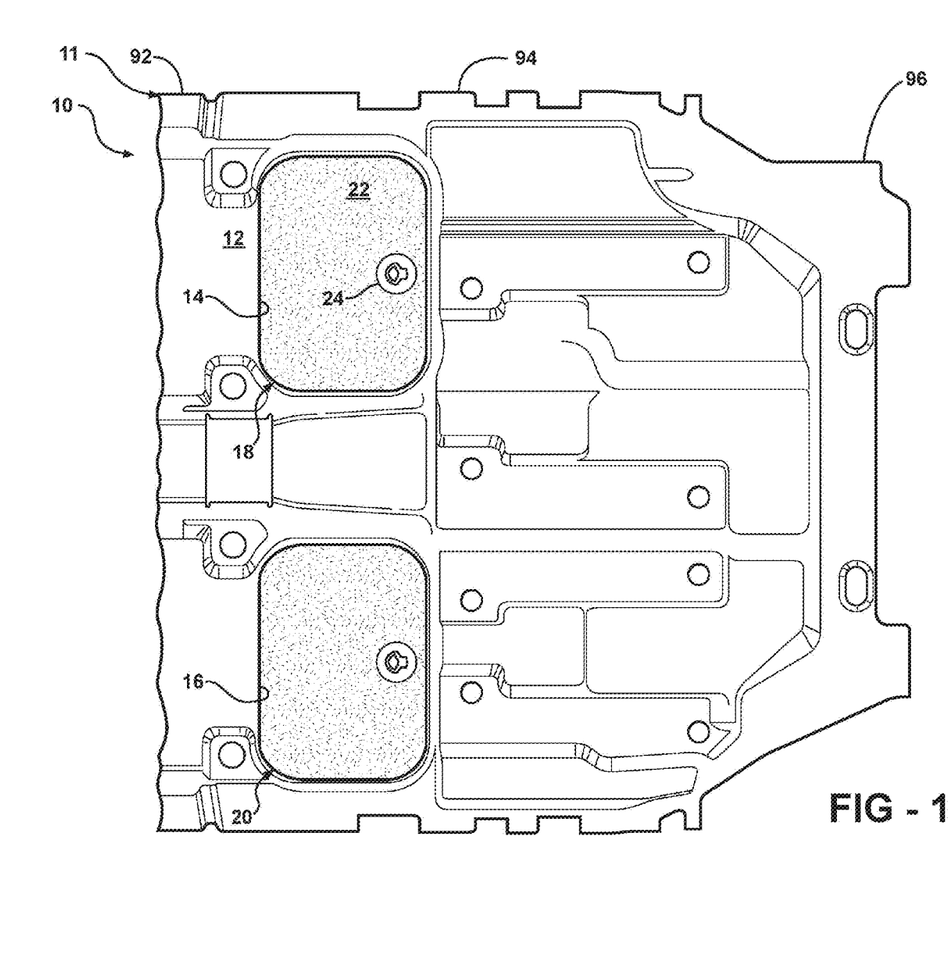
FIG. 1 is a top view of an exemplary vehicle in-floor storage system featuring two second-row in-floor storage devices in accordance with the invention.
Figure 2:
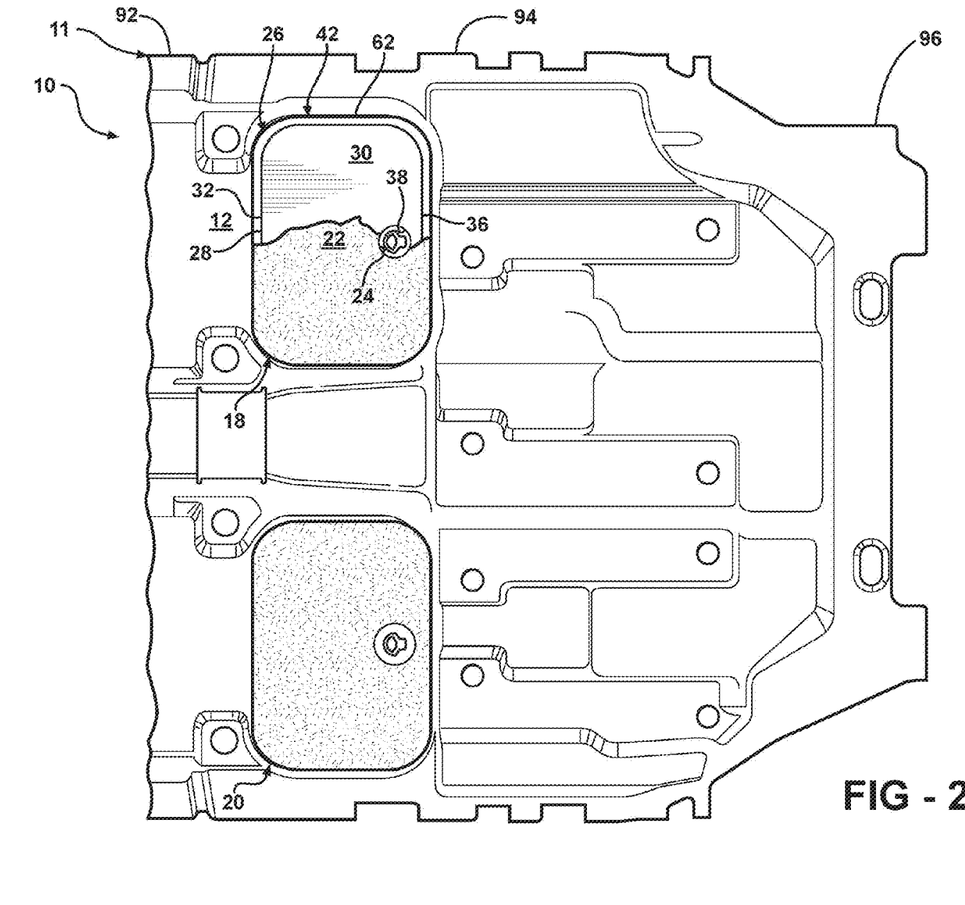
FIG. 2 is a top view of the vehicle storage system of FIG. 1, with the lid assembly of one of the in-floor storage devices being partially cutaway to illustrate the assembly's frame, lid, and lid cover.
Figure 3:
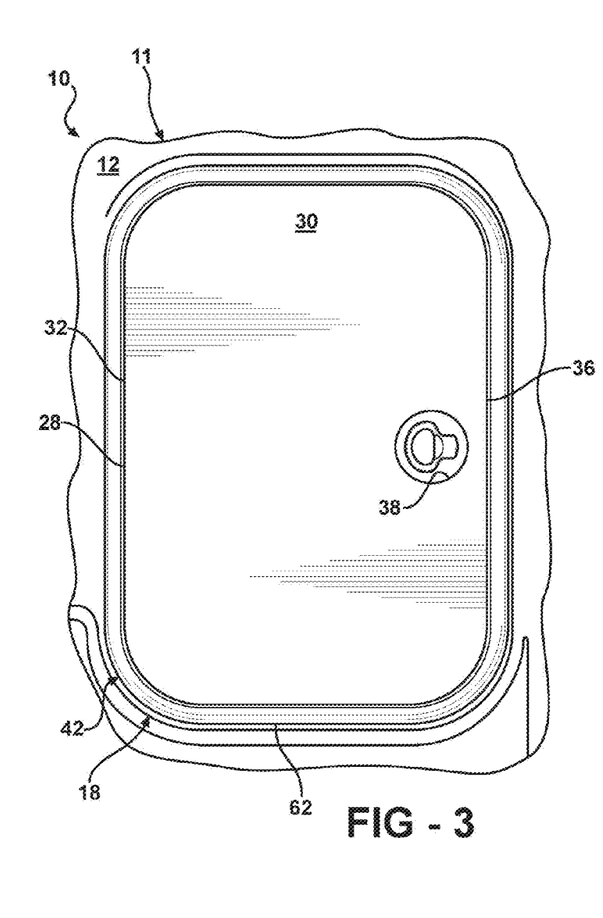
FIG. 3 is an enlarged view of one of the in-floor storage devices of FIG. 1 with the its lid cover removed to better show the rest of the lid assembly (with its lid in a closed position)
Figure 4:
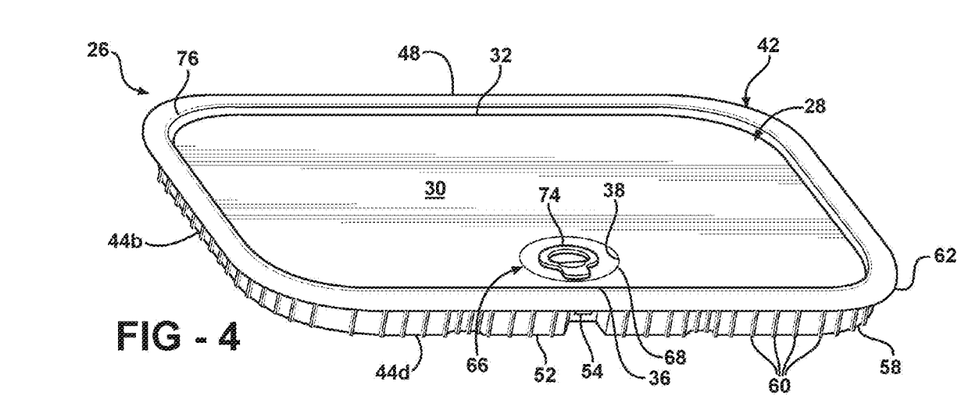
FIG. 4 is a perspective view of the lid assembly of FIG. 3.
Figure 5:
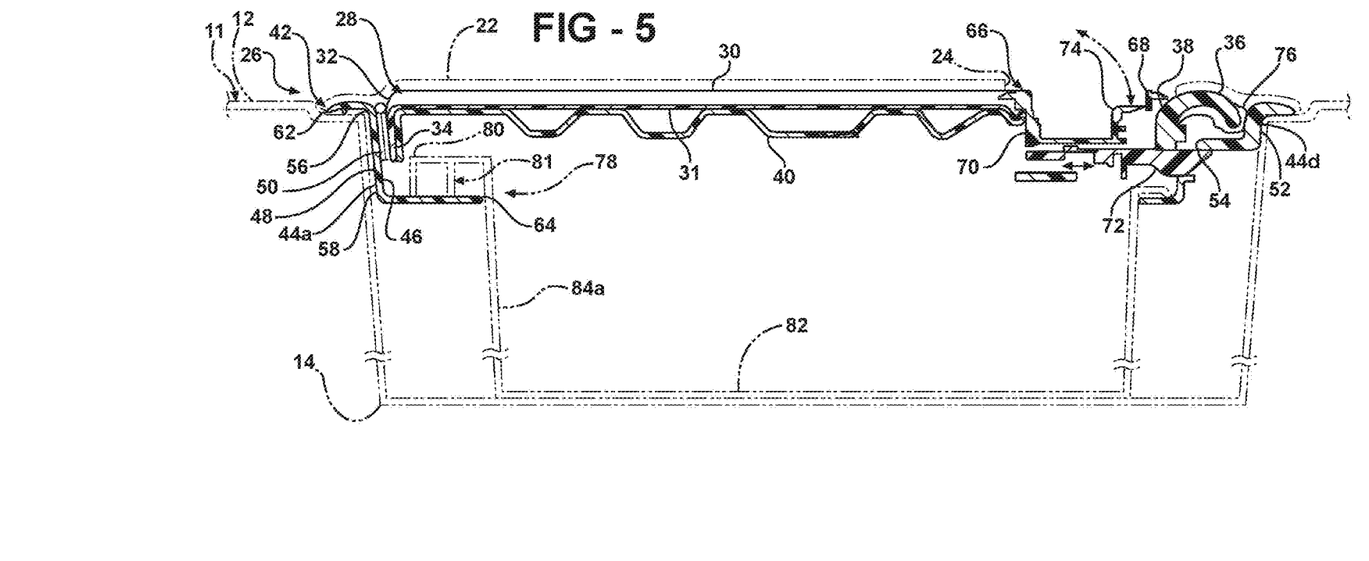
FIG. 5 is a cross-sectional view of the lid assembly of FIG. 4.
Figure 6:
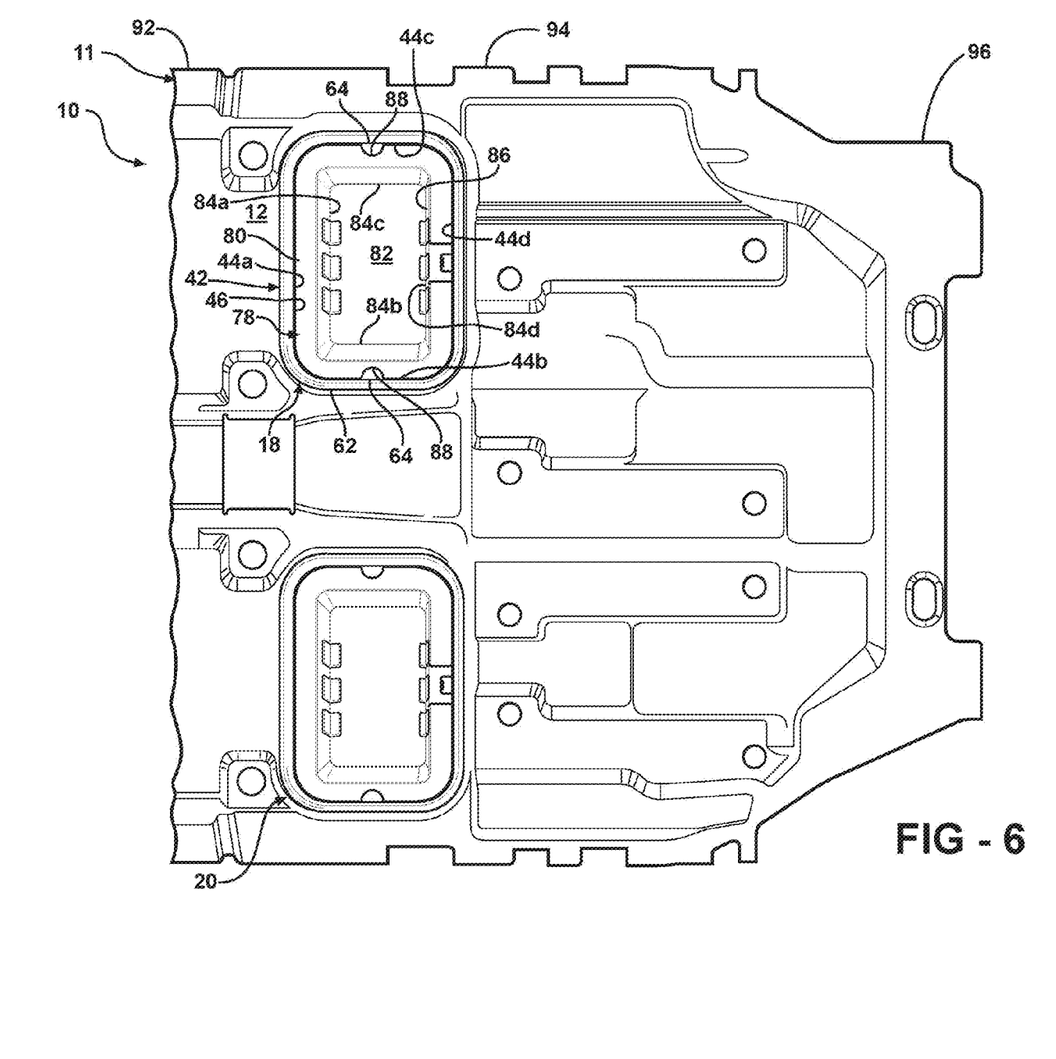
FIG. 6 is a top view of the vehicle storage system of FIG. 1, with the lids removed to better illustrate each storage device's removable storage bin, as supported on its periphery by the lid assembly frame.
Figure 7:
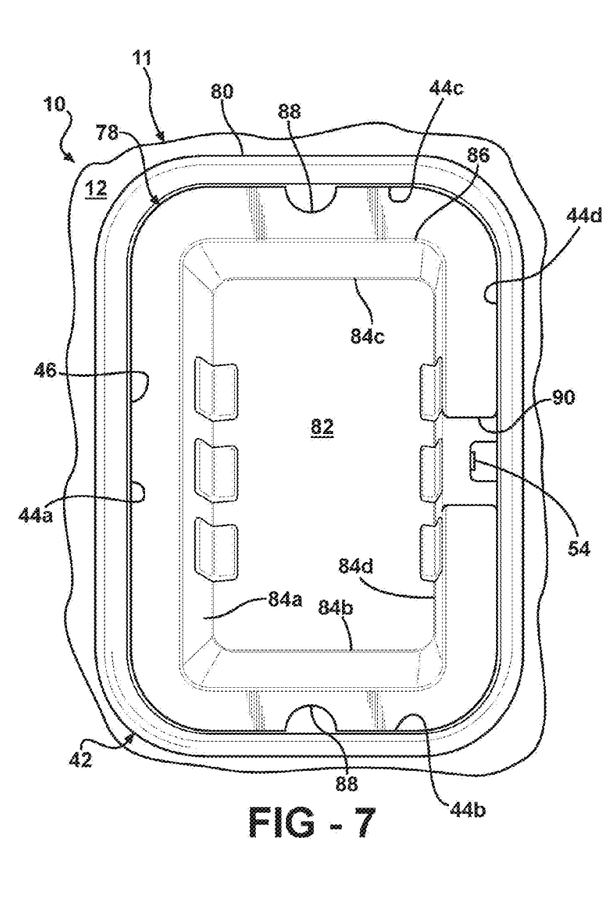
FIG. 7 is an enlarged, partial top view of one of the removable storage bins of FIG. 6 as supported by the lid assembly frame, again with the lid removed for better illustration.
Figure 8:
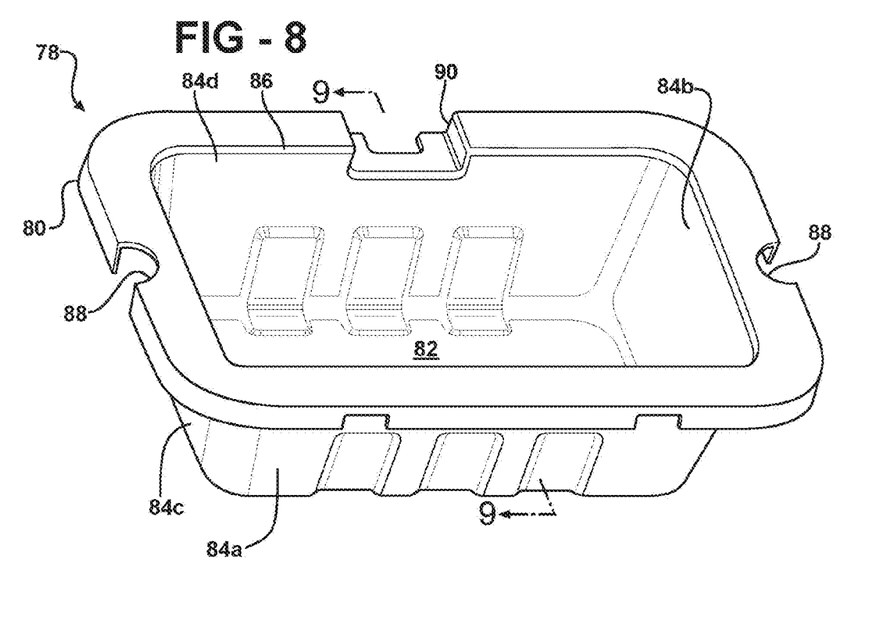
FIG. 8 is a perspective view of one of the removable storage bins of FIG. 6.

As best seen in FIGS. 3-5, the first storage device 18 includes a lid assembly 26 having a frame 42 disposed about the periphery of the floorpan well 14. The frame 42 includes a peripheral wall 44 including first and second end wall portions 44a,44b and side wall portions 44c,44d which extends about the upper portion of the floorpan well 14, to thereby frame an opening 46 into the floorpan well 14. Each wall portion 44a,44b, 44c,44d includes a top portion 56, a bottom portion 58, and a plurality of reinforcing ribs 60 extending between the top and bottom portions 56,58. The frame 42 also includes an external retaining flange 62 that extends outwardly from the top portion 56 of each wall portion 44a,44b, 44c,44d to overlie and engage the surface 12 of the floorpan 11 adjacent to the floorpan well 14 when the frame 42 is mounted on the floorpan 11, for example, by an adhesive or suitable fastener. In addition, the bottom portion 58 of each frame wall portions 44 includes an inwardly-directed perimeter flange or multiple projections defining a bin seat 64, while the bottom portion of the second end wall portion 44d further defines a latch striker 54.

As best seen in FIG. 5, the lid assembly 26 also includes a lid 28 with an upper surface 30, a bottom surface 31, and a downwardly-projecting flange 34 defined on along one edge portion 32. In the exemplary storage system's lid assembly 26, the lid's downwardly-projecting flange 34 is pivotally mounted on the first end wall portion 44a of the frame 42 by a piano hinge 50. It will be appreciated, however, that the invention contemplates use of alternative hinge constructions, including without limitation a tabbed hinge and a living hinge. The lid 28 is thus movable between an open position providing access to the opening 46 in the frame 42, and a closed position closing the frame opening 46, with the lid 28 in its closed position being generally coplanar with the adjacent floorpan surface 12. The lid's bottom surface 31 is reinforced with webbing 40 of a suitable configuration. It will be appreciated that the lid 28 may be formed of one or more layers of polyurethane or other suitable materials to advantageously decrease heat and/or noise transfer through the lid 28.

As best seen in FIGS. 3-5, the lid 28 also includes a closure mechanism 66 mounted in a suitable aperture 38 formed in the lid 28 proximate to an opposite edge portion 36, and a cover 22 applied to the lid's upper surface 30 and made of any suitable material such as carpeting, or an elastomer tread with channels or reservoirs. The closure mechanism 66 includes a housing 68 received within the lid aperture 38 to thereby define a recess 70 that is accessible through an access hole 24 defined in the cover 22. A latch member 72 disposed within the housing recess 70 is movable, upon operation of a handle 74, between unlatched and latched positions with respect to the latch striker 54 on the frame 42. A seal 76 mounted on the frame 42 or the lid 28 assists in sealing the lid 28 within the frame opening 46 when the lid 28 is moved to its closed position.

Figure 11:
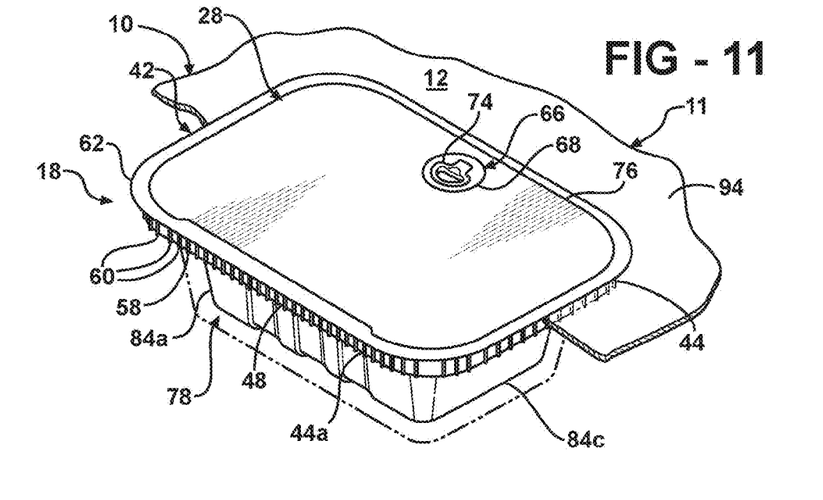
FIG. 11 is an exploded partial perspective view, partially broken away, of the assembled in-floor storage system of FIG. 1, after insertion of the removable storage bin into the opening defined by the lid assembly frame.
Figure 12:
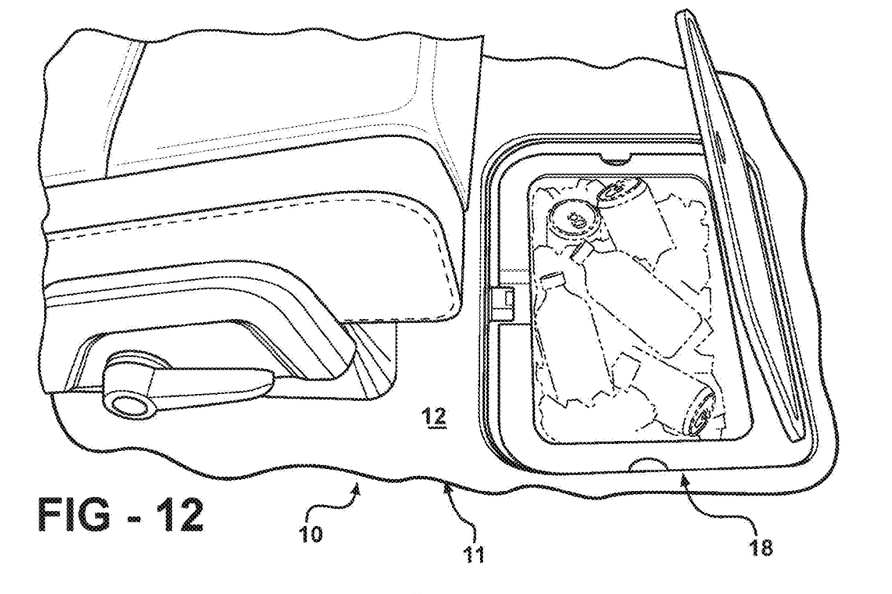
FIG. 12 is a partial perspective view of an exemplary vehicle in-floor storage system in accordance with the invention for storing ice and beverages generally beneath a surface of the floorpan.

Referring to FIGS. 6-11, the first storage device 18 includes a removable storage bin 78 adapted to be received and supported within the frame opening 46 of the lid assembly 26, to thereby define a storage chamber 86 located generally beneath the surface 12 of the second row section 94 of the floorpan 11. More specifically, the bin 78 includes a bottom wall portion 82 and four sidewall portions 84a,84b, 84c,84d. The bin 78 also includes an external bin flange 80 defined on its outer perimeter, preferably at or near the upper extent of each sidewall portion 84a,84b,84c,84d, that is received within the frame opening 46 and that engages the frame's bin seat 64 to thereby support the bin 78 within the lid assembly 26. It will be appreciated that the bottom wall portion 82 of the bin 78 may be allowed to touch or otherwise rest on the bottom of the floorpan well 14 (as shown in phantom lines in FIG. 5) to thereby maximize the depth of the resulting storage chamber 86; or the bin's bottom wall portion 82 may be deliberately spaced from the floorpan well 14 (as shown in FIG. 11) to minimize noise and/or heat transfer from the floorpan well 14 into and through the storage device 18.

Figure 9:
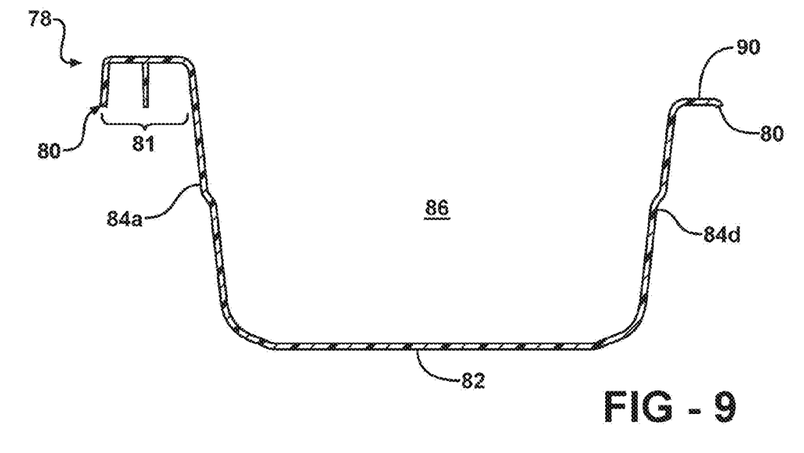
FIG. 9 is a cross-sectional view of the removable storage bin taken along line 9-9 of FIG. 8.
Figure 10:
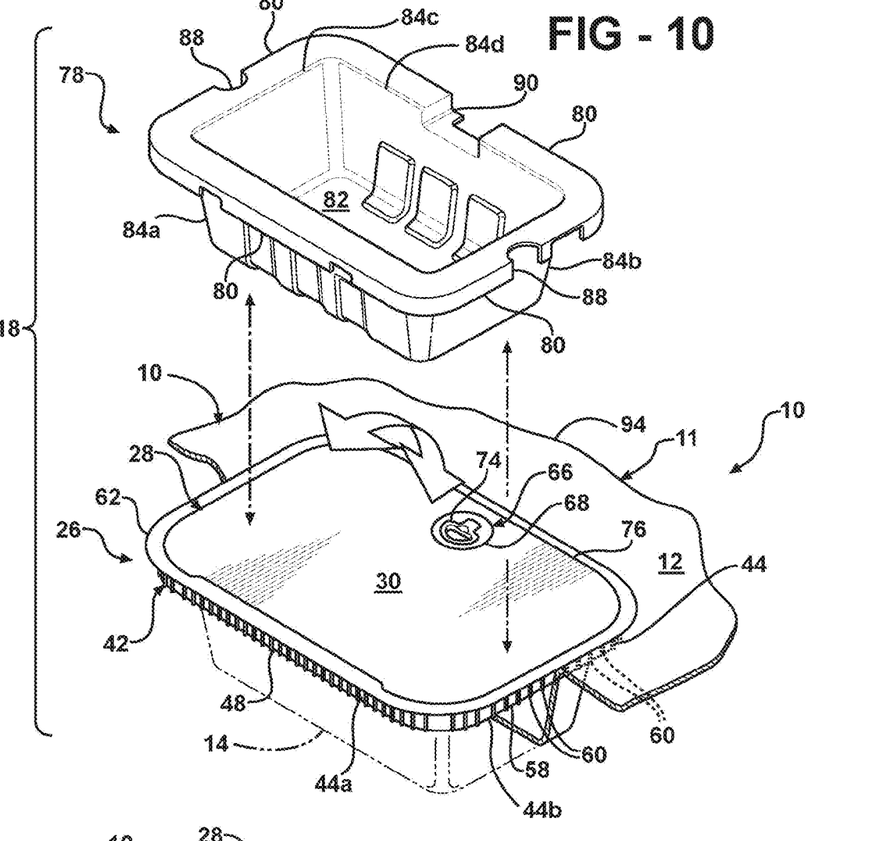
FIG. 10 is an exploded partial view in perspective of the in-floor storage system of FIG. 1, illustrating the removable storage bin prior to its insertion into the lid assembly frame.

Referring now to FIGS. 6-13, while the bin flange 80 is illustrated as a continuous external flange extending about the entire perimeter of the bin 78, it will be appreciated that the bin flange 80 may alternatively be defined by multiple discontinuous external flanges or other projections on the bin 78. The bin flange 80 may have a stilted or pronged configuration 81, as shown in FIGS. 4 and 9, with which to engage the bin seat 64. The bin flange 80 also advantageously includes peripheral notches 88 to facilitate insertion and removal of the bin 78 into the frame opening 46, as well as a recessed portion 90 for receiving and providing clearance for the closure mechanism's latch member 72 when the lid 28 is moved to its closed position.

Figure 13:
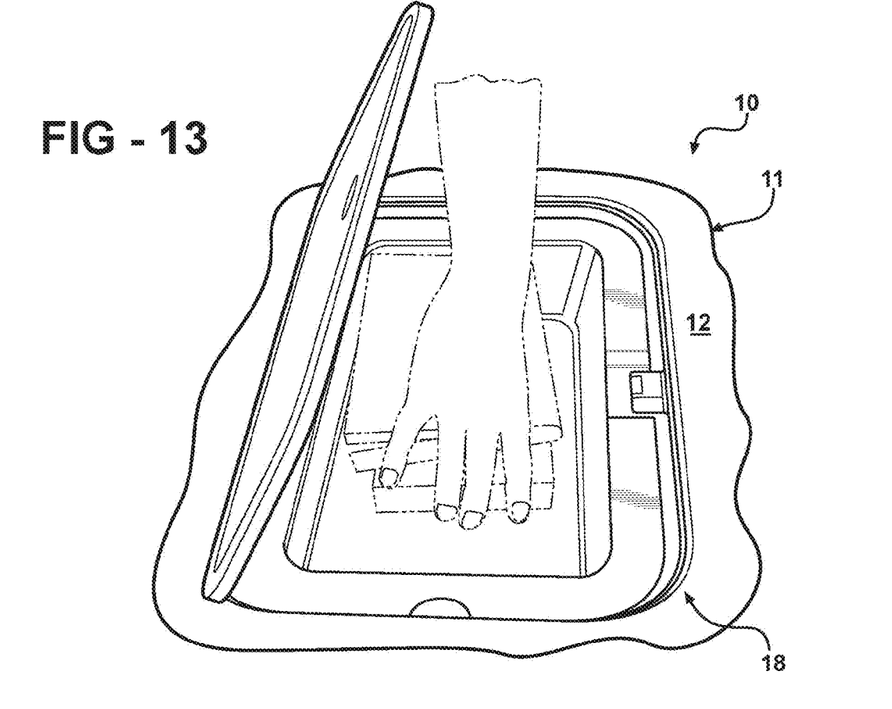
FIG. 13 is a partial perspective view of another exemplary vehicle in-floor storage system in accordance with the invention for the concealed storage of documents and valuables generally beneath a surface of the floorpan.

Referring again to FIG. 12, the lid assembly 26, the bin 78, and the seal 76 may each have a predetermined coefficient of thermal conductivity for maintaining contents of the storage device 18 at predetermined temperatures. For instance, the storage device 18 may be used to contain ice, beverages and food. And, as illustrated in FIG. 13, the storage device 18 may advantageously provide relatively concealed storage for passports, check books, electronic devices, jewelry and other items generally beneath the surface 12 of the second row portion 94 of the floorpan 11. Accordingly, the storage device 10 may conceal those items, provide additional storage space and increase available space within the passenger cabin. It will be appreciated that the lid assembly 26 and the bin 78 can have various constructions and/or configurations for storing a variety of items generally underneath a surface 12 of a vehicle floorpan. 11

From the foregoing, it will be appreciated that the invention advantageously provides a removable storage bin 78, or an interchangeable set of storage bins of different configurations or capabilities, supported beneath the nominal floorpan surface 12 by a lid assembly 26, wherein the storage bin 78 can be readily removed from the vehicle, for example, to facilitate the transport of its contents, to allow reconfiguration of in-floor storage, and to facilitate the cleaning or replacement of the storage bin 78 itself.

The above description of embodiments of the invention is merely exemplary in nature and, thus, variations thereof are not to be regarded as a departure from the spirit and scope of the invention.

What is claimed is:

1. A vehicle storage system comprising:
   a vehicle floorpan defining a well extending generally beneath the floorpan surface with an upper portion, a lower portion, and a bottom surface, and a floorpan surface adjacent to the floorpan well;
   a lid assembly including a frame separate from and attached to the floorpan, wherein the frame includes a perimeter wall extending into the upper portion of the floorpan well to define a frame opening, and wherein the frame defines a bin seat within the floorpan well adapted to support a storage bin received within the frame opening, and a lid pivotally attached to the frame and movable between an open position providing access to the frame opening and a closed position closing the frame opening; and
   a storage bin removably received within the opening of the frame and extending into the lower portion of the floorpan well, wherein the bin includes an external feature adapted to engage the bin seat of the frame to thereby support the storage bin within the floorpan well of the floorpan, whereby the storage bin defines a storage chamber generally beneath the floorpan surface.

2. The vehicle storage system of claim 1, wherein the frame includes an external flange overlying the floorpan surface.

3. The vehicle storage system of claim 2, wherein the external flange of the frame is attached to the floorpan surface.

4. The vehicle storage system of claim 2, wherein the floorpan surface defines a peripheral recess about the floorpan well, and wherein the external flange of the frame is disposed within the peripheral recess.

5. The vehicle storage system of claim 4, wherein an upper surface of the external flange of the frame is generally coplanar with the floorpan surface adjacent to the peripheral recess.

6. The vehicle storage system of claim 1, wherein the frame includes a frame feature extending inwardly into the frame opening, and wherein the bin seat is defined on the frame feature.

7. The vehicle storage system of claim 6, wherein the frame feature is an internal flange extending inwardly from the perimeter wall of the frame.

8. The vehicle storage system of claim 7, wherein the external feature of the storage bin is a continuous peripheral flange complementary to the internal flange of the frame.

9. The vehicle storage system of claim 8, wherein the continuous peripheral flange of the storage bin is disposed completely within the floorpan well when engaging the bin seat of the frame.

10. The vehicle storage system of claim 8, including a notch in the continuous peripheral flange of the storage bin facilitating removal of the storage bin from the frame opening.

11. The vehicle storage system of claim 1, wherein the perimeter wall of the frame is disposed only in the upper portion of the floorpan well.

12. The vehicle storage system of claim 1, wherein the storage bin includes a bottom wall, and wherein the bottom wall of the storage bin is spaced from the bottom wall of the floorpan well when the storage bin is supported within the frame opening by the bin seat of the frame.

13. The vehicle storage system of claim 12, wherein the external feature of the storage bin includes an external outwardly extending bin flange configured to engage the bin seat and support the bottom wall of the storage bin in spaced relation to the bottom wall of the floorpan well.

* * * * *